Feb. 20, 1962 A. G. WILSON 3,021,914
ACOUSTICAL PANEL
Filed July 11, 1958 2 Sheets-Sheet 1

INVENTOR
ALBERT GERALD WILSON
BY Beaman & Beaman
ATTORNEY

Feb. 20, 1962  A. G. WILSON  3,021,914
ACOUSTICAL PANEL

Filed July 11, 1958  2 Sheets-Sheet 2

INVENTOR
ALBERT GERALD WILSON
BY *Beaman & Beaman*
ATTORNEY

United States Patent Office 3,021,914
Patented Feb. 20, 1962

3,021,914
ACOUSTICAL PANEL
Albert Gerald Wilson, 403 2nd St., Lexington, Mass.
Filed July 11, 1958, Ser. No. 747,981
9 Claims. (Cl. 181—33)

The present invention relates to sound absorbing means and particularly pertains to a sound absorbing panel construction wherein reflected sound waves are dispersed so as to reduce standing wave effects.

In the sound deadening or absorbing art it is known that a sound wave passing through a medium of varying density will be refracted or bent in a direction toward the denser portions of the medium and it is an object of the invention to utilize this characteristic of sound transmission to provide a superior sound absorbing means.

Another object of the invention is to provide a sound absorbing construction of variable density over the effective area of the sound absorbing material whereby sound waves are refracted in passing through the material.

A further object of the invention is to provide a sound absorbing panel wherein a sound dampening and a sound absorbing material of varying density over the exposed area are combined to produce sound absorption and dispersion which will substantially reduce standing sound waves.

Yet another object of the invention is to provide a sound absorbing panel construction which when used to define an enclosure effectively shields the enclosure from exterior sound vibrations and absorbs and disperses sound waves within the enclosure.

A further object of the invention is to produce an acoustical panel wherein the surface of the sound absorbing material is arcuate in configuration for aiding reflection of the sound waves by the material.

Figure 1:
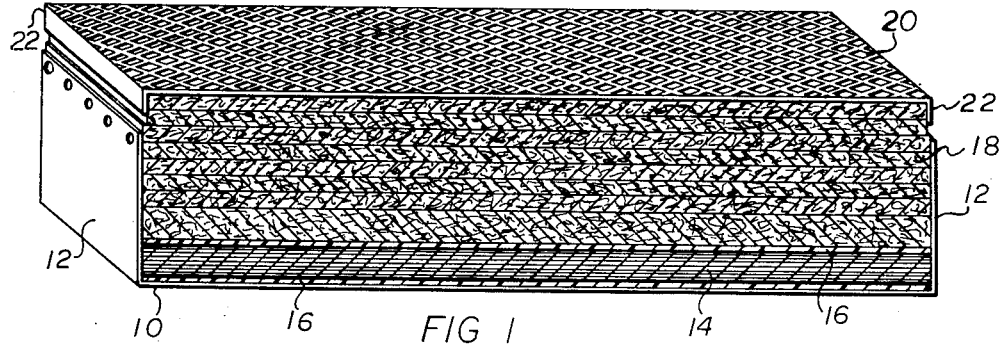
Figure 2:
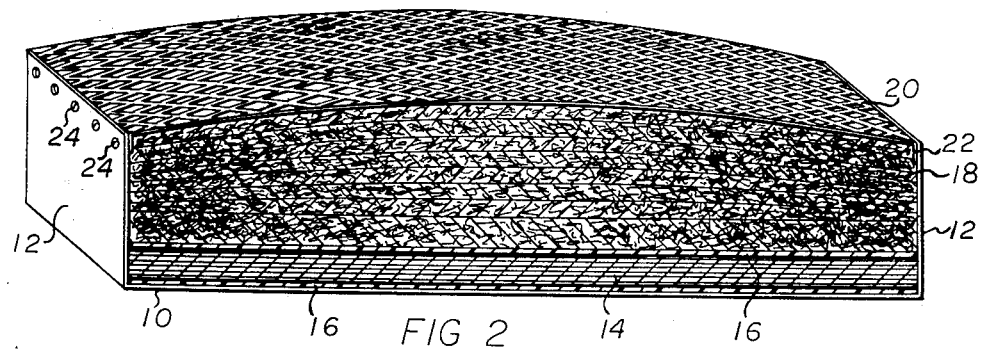
Figure 5:
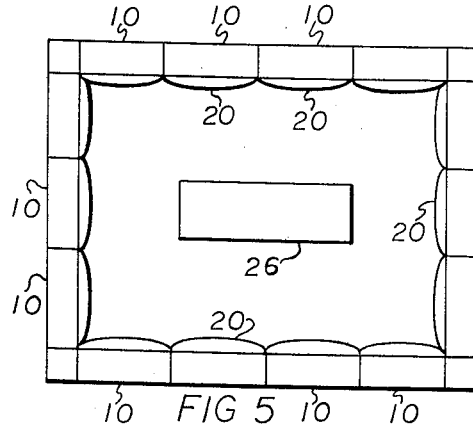
Figure 4:
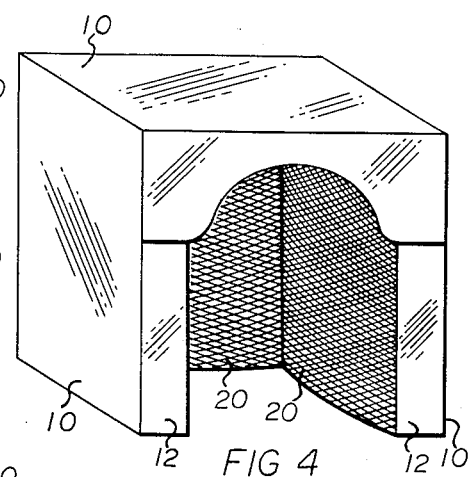
Figure 3:
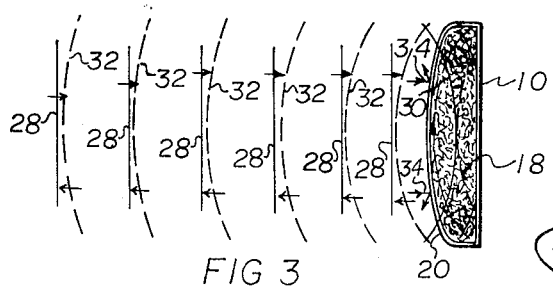

These and other objects of the invention will become apparent when considered with regard to the following description and accompanying drawings wherein:

FIG. 1 is a sectional perspective transverse elevational view of the preferred panel construction before compression, FIG. 2 is a perspective transverse elevational sectional view of the panel of FIG. 1 in the final form after compression, FIG. 3 is a reduced scale graphical representation of sound wave refraction and absorption of the panel of FIG. 2, FIG. 4 is a reduced scale perspective view of a telephone booth constructed of panels of the invention, FIG. 5 is a reduced scale plan view of a sound proof room employing a plurality of panels in accordance with the invention, and FIGS. 6–9 are elevational section transverse views of various modifications of panel construction employing the concept of the invention.

It has been proven by extensive tests that a large percentage of objectionable sound waves wthin an enclosure, such as a room, booth, compartment or the like is produced by a reflection effect of the sound waves from the walls defining the enclosure. Thus sound waves originating in the center of a rectangular room approach the walls thereof substantially at right angles and the reflected waves is also returned from the wall at right angles. As the sound waves are thus reflected back and forth between the reflective walls the noise level rises due to coincidence of some of the waves resulting in a highly objectionable condition. This condition is especially serious in ship engine rooms wherein an engine is creating sound waves within a confined enclosure of steel walls.

The above described effect is known as the "standing wave effect" and it is the object of the invention to provide a sound absorbing panel which will absorb as much noise as possible and disperse those sound waves which are reflected so as to prevent creation of standing waves. The preferred panel construction is shown in FIG. 1 and consists of a casing or shell 10 which is usually of rectangular configuration having edge walls 12 and being open at one side. The casing 10 is constructed of a rigid sound impervious dense material such as steel, aluminum, magnesium, plastic, etc. which will reflect most of the sound waves impinging thereon.

A lightweight, sound dampening member 14 of a substantially rigid material construction such as a commercially available bonded cellular material known as "Celotex" or "Abestocel" is used to provide rigidity to the casing without the addition of excessive weight to the panel and to absorb sound passing through the casing and also passing through the sound absorbing material as will be later explained. The member 14 is in the form of a planar board or panel and is preferably coated on each side with a bonding resin 16 which, besides adding rigidity to the member 14, will bond the casing 10 to the member 14 and render the member nonporous. Sound waves encountering an impervious sheet material as casing 10 will set up a vibration in the casing and the resulting diaphragmatic effect will produce sound waves within the casing proper, however, by bonding a rigid, low density, sound absorbing material directly to the casing 10 the diaphragmatic effect is substantially reduced and vibration of the casing effectively controlled.

The remainder of the casing 10 is filled with a sound absorbing material 18, preferably glass fiber, however, other fibrous or non-fibrous materials may be used. The material 18 may eihter consist of a plurality of layers or a single layer of sufficient thickness to project above the top of the edge walls 12, as in FIG. 1. Although the principles of the invention are present when using either a plurality of layers of material 18 or a single layer, superior sound absorption may be obtained with a multiplicity of layers due to the air space therebetween and variations in sound wave refraction can be produced by using a higher density material 18 in the layers closest to member 14.

To protect the material 18 and provide means for obtaining and maintaining compression and the desired density variation within the material, a screen 20 covers the entire exposed area of the outer layer 18 and is flanged at 22 about the periphery whereby screws 24 may affix the screen to the edge walls 12. It is desirable to make the screen 20 of maximum open area such that the screen will not reflect sound waves itself; however, practically, the screen must provide adequate protection of the sound absorbing material against frictional contact and malicious damage as may be encountered when the panel is used in a telephone booth. Expanded metal has proven satisfactory as a screen for telephone booth construction; however, other applications may employ chicken wire or other type of open screening. Ideally, it would be best if a screen 20 were not employed at all and with installations wherein the panel is not subject to possible damage the screen may be dispensed with if other compression means for the material 18 is provided.

The elements are stacked as in FIG. 1 wherein the screen 20 is planar and is resting upon the sound absorbing material 18 which extends above edge walls 12, as mentioned above, and the dampening member 14 is bonded to the casing 10. To assemble the panel of the invention the screen 20 is moved toward the casing 10, compressing material 18, until the flanged edge 22 sufficiently engages the inside of edge walls 12 to permit screws 24 to fasten the casing and screen in assembled relation as in FIG. 2. As assembled, the material 18, being under compression, will force the screen 20 to form a convex surface having a maximum distance from member 14 at the center of the panel. The convex shape of the screen permits the material 18 to uniformly vary in density form a maximum value adjacent the walls 12 of the casing, where compression is the greatest, to a minimum value at the center of the panel where compression is least. The panel may now be used as a structural member to define a wall, screen, baffle etc. See FIG. 5 wherein a plurality of panels may be used to enclose a noise generating device as a diesel engine 26.

The effective sound absorbing and dispersion characteristics of the panel may be best understood by reference to FIG. 3. Representing sound waves approaching the panel at right angles thereto by the lines 28, it will be appreciated that as the sound wave passes through the sound absorbing medium 18 most of the sound will be absorbed and frictionally dissipated by the fibers in the known manner; however, as the material 18 cannot absorb all of the sound vibrations the unabsorbed sound in traveling through the material 18 will be refracted toward the denser portion of the material and hence will begin to assume a concave shape as represented by line 30. As the sound wave strikes the denser medium of dampening member 14 and casing 10 the wave will be reflected back toward the source and passing again through material 18 is further refracted toward the denser medium. The reflected waves are represented by the dotted lines 32 and, of course, will be of much smaller magnitude than the original waves 30 due to the sound absorbing capacity of the panel. The reflected waves 32 are hence substantially refracted in passing through the panel twice and emerge in a convex pattern as the maximum density of the material 18 occurs throughout the entire periphery of the panel. Thus the waves 32 leaving the panel are moving at an angle to the incident waves and hence cannot coincide with the original waves to create a standing wave pattern. Assuming the panel of FIG. 3 to be used as in FIG. 5 many of the reflected waves 32 will be directed toward and absorbed by adjacent walls, rather than opposite walls, and the resulting absorption and dispersion of the sound waves effectively reduces the noise level within the sound proofed enclosure. Superior sound vibration control is further enhanced by the panel of the invention due to the increased sound absorption resulting from the lengthened path of sound travel caused by refraction of the sound waves. Thus as the wave path is bent in traveling through the material 18 the length of the wave path is increased and the material 18 is given an increased opportunity to absorb the sound.

In tests the panel above described was subjected to experiments to determine the Normal Incidence Absorption Coefficient (NIAC) and the actual effectiveness of the variable density panel. A panel was constructed having a uniform area density equal to the minimum density of the panel of the invention, e.g. the density at the center of the panel. This panel was subjected to a controlled frequency range and had an average NIAC of .53. A second panel having a uniform density over the panel area equal to the maximum density of the sound absorbing material 18, e.g. the density at the periphery of the casing 10 adjacent edge walls 12 was likewise tested and averaged a NIAC reading of .64. The variable density panel of FIG. 2 was subjected to the same test procedure and produced a NIAC of .73, thus substantiating the concept of increased sound absorption and decreased standing wave effect provided by the varying density of the sound absorbing material from the periphery to the center of the panel.

The arcuate surface of the screen 20 is also instrumental in dispensing the sound waves in that the vibrations which are reflected from the screen directly, or the surface of the material, will be directed off at an angle to the direction of origination as represented by the arrows 34 thereby preventing standing wave effects. The shape of the screen 20 is preferably substantially spherical and this shape is also believed to aid in the refraction of the sound waves entering the material 18.

FIG. 4 illustrates another construction in which the panels of the invention may be utilized. By affixing four of the casings 10 together as three walls and a roof a telephone booth of superior character may be provided and such booths have found usage for inter-communication phones in the noisy engine rooms of high speed vessels.

It will be appreciated that the concept of using a sound absorbing panel of variable density over the area of the panel sound absorbing means may take many forms other than that described above. For instance, the material 18 may be manufactured with a high density periphery and the screen 20 preformed whereby density variations are not produced by compression. Other forms of embodiments are shown in FIGS. 6–9 wherein similar components to those described above are identified by like reference numerals and equivalent components by primes.

Figure 6:
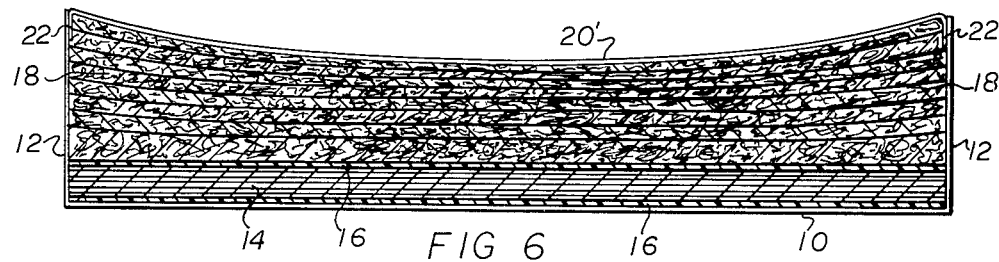

FIG. 6 illustrates a panel having a concave surface screen 20' whereby surface reflections will be reflected at an angle to the incident wave but in the opposite direction from the angle of the panel of FIG. 2 and FIG. 3. The fibrous material of this embodiment has the maximum density at the central region of the panel and the density decreases adjacent the edge walls 12.

Figure 7:
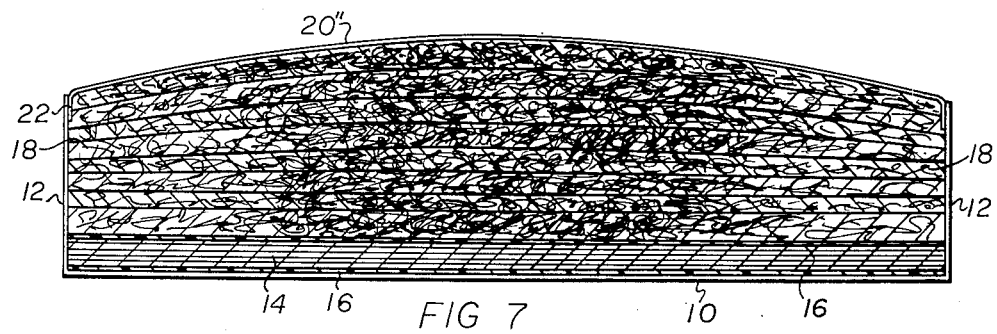

FIG. 7 discloses another embodiment wherein a convex surface screen 20" is retained, however, the denser sound absorbing medium is at the center of the panel and the less dense material adjacent the edge walls 12. Such a construction will refract the sound waves in an inverted convex pattern with respect to the convex pattern 32 of FIG. 3, however, the refraction and dispersion will likewise prevent the standing wave effect. It will be understood that the material 18 of FIGS. 6 and 7 would require pre-compression or be manufactured with the indicated density variations as the indicated densities could not be obtained by compression in the manner of the panel of FIG. 2.

It will be appreciated that by using a pre-formed concave screen a panel having a maximum density at the center thereof may be formed by compression.

Figure 8:
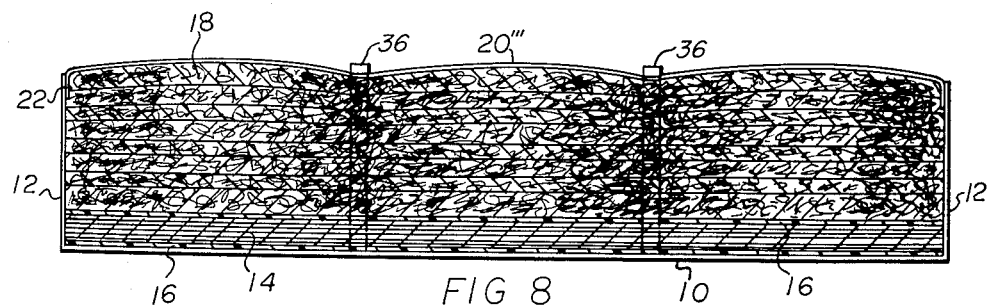
Figure 9:
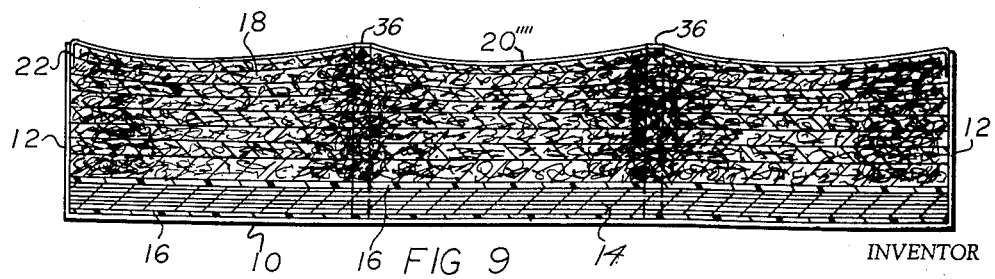

FIGS. 8 and 9 illustrate other panel constructions wherein the panel is provided with a plurality of convex and concave surface screens 20''' and 20'''', respectively, with attendant variations in sound absorbing material density, the density of the absorbing material being greatest in those areas represented by the darkest shading. Such construction would find primary use on relatively large panels and fastening members 36 would be required to maintain the screen shape if compression is used to provide the variable densities.

It is understood that modifications of the invention other than the above embodiments may occur to those skilled in the art and it is intended that the spirit of the invention be defined only by the scope of the following claims.

I claim:

1. In a sound absorbing panel, a supporting casing of rigid sound impervious material having an outer periphery, a lightweight substantially rigid sound dampening member bonded to said impervious material, a sound absorbing material mounted on said casing adjacent to said dampening member having an exposed surface, the density of said sound absorbing material being such as to be of a maximum value adjacent the periphery of said casing and of a minimum value at the center of said casing.

2. In a sound absorbing panel as in claim 1 wherein said dampening panel is of a bonded cellular material having a rigid, sound impervious layer of resin bonded to each side thereof and said sound absorbing material is a compressible fibrous mass.

3. In a sound absorbing panel as in claim 1 wherein the exposed surface of said sound absorbing material is substantially convex.

4. In a sound absorbing panel, a supporting casing of rigid, sound impervious material having an outer periphery, a rigid sound dampening member having a rigid layer of resin bonded to each side thereof bonded to said impervious material, a fibrous sound absorbing material supported on said casing adjacent said dampening member and means maintaining said sound absorbing material on said casing such that the density thereof uniformly varies from a maximum value to a minimum value in accordance with the distance of said sound absorbing material from the periphery of said casing.

5. In a sound absorbing panel as in claim 4 wherein the density of said sound absorbing material is at a maximum value adjacent the periphery of said casing and is at a minimum at the center of said casing.

6. In a sound absorbing panel as in claim 4 wherein said means maintaining said sound absorbing material on said casing comprises an open face protective screen of low sound reflective character.

7. In a sound absorbing panel as in claim 6 wherein said screen is of convex configuration.

8. In a sound absorbing panel, a box-like casing of sound impervious material, said casing being open at one side and including a back and depending edge portions, a cellular resin coated sound dampening member bonded to said casing back within said casing, a fibrous sound absorbing material within said casing having an inner surface contiguous with said dampening member and an outer surface accessible through the open side of said casing and protective screen means affixed to the edges of said casing enclosing the open side thereof and compressing said sound absorbing material such that the density thereof varies from a maximum value adjacent the casing edges to a minimum value at the panel region the greatest distance from said edges.

9. An acoustical panel comprising, in combination, a substantially rigid, sound impervious casing formed of sheet material, said casing having a planar back and peripheral edge portions extending therefrom defining a box-like configuration having an open side, a low density lightweight sound-dampening panel member within said casing and bonded to said back, a compressible, sound-absorbing material within said casing having an inner surface directly exposed to the sound to be controlled entering said casing through said open side, and means selectively compressing said sound absorbing material varying the density thereof over the area of said sound-absorbing material outer surface.

References Cited in the file of this patent

UNITED STATES PATENTS

| | | |
|---|---|---|
| 648,632 | Parker | May 1, 1900 |
| 1,859,996 | Simpson | May 24, 1932 |
| 1,874,659 | Upson | Aug. 30, 1932 |
| 1,908,917 | Phillips | May 16, 1933 |
| 1,974,465 | Lewis | Sept. 25, 1934 |
| 2,113,128 | Cunnington | Apr. 5, 1938 |
| 2,147,059 | Randall | Feb. 14, 1939 |
| 2,759,554 | Baruch | Aug. 21, 1956 |
| 2,759,556 | Baruch | Aug. 21, 1956 |
| 2,913,075 | Zittle | Nov. 17, 1959 |
| 2,924,857 | Gruber et al. | Feb. 16, 1960 |

FOREIGN PATENTS

| | | |
|---|---|---|
| 918,596 | France | Oct. 28, 1946 |
| 58,611 | France | Oct. 21, 1953 |
| | (1st addition to No. 918,596) | |